July 4, 1950      J. A. CHILMAN ET AL      2,514,178
SYNCHRONIZING AND SPEED CONTROL DEVICE
Filed June 19, 1946      4 Sheets-Sheet 1
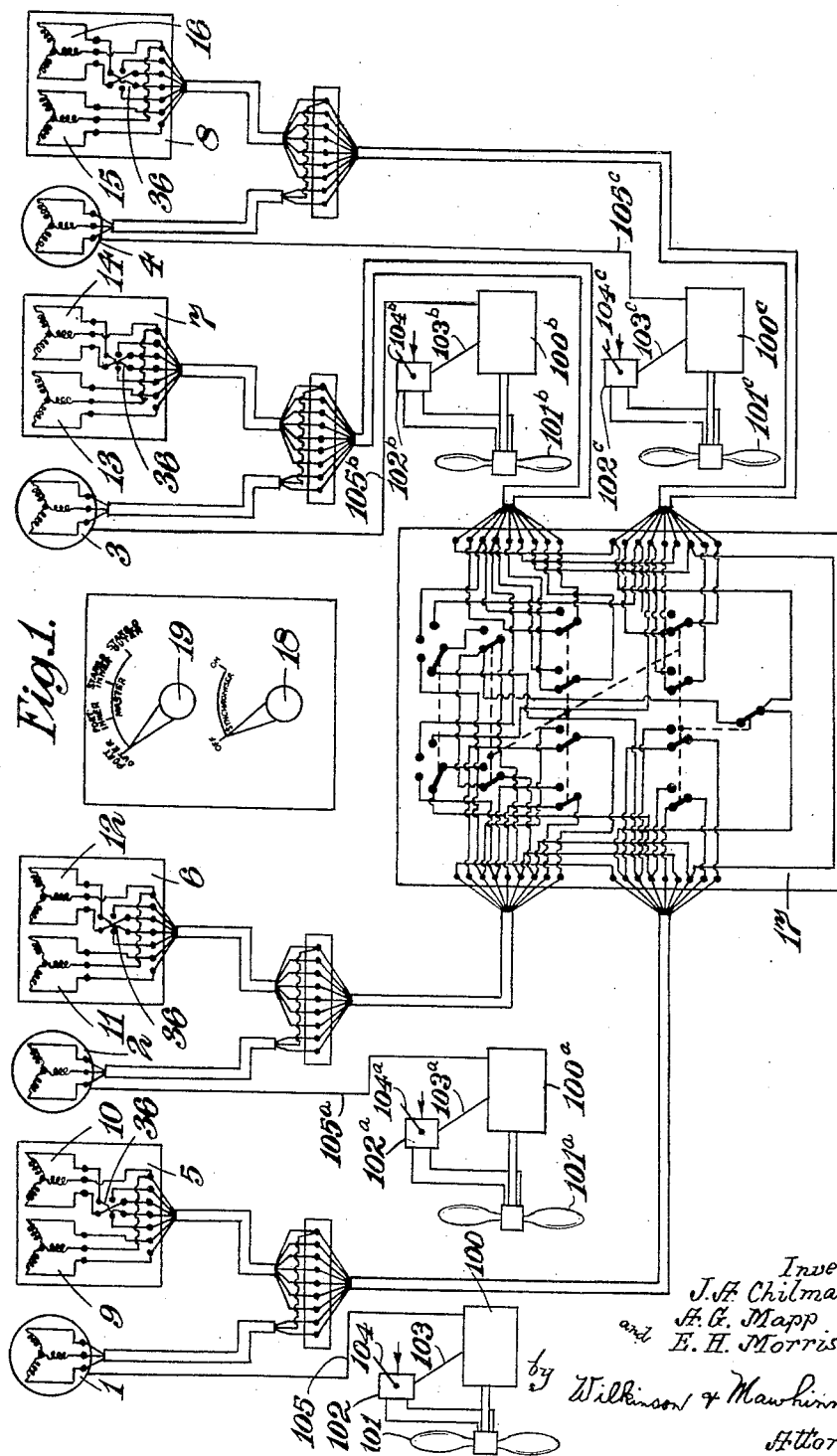

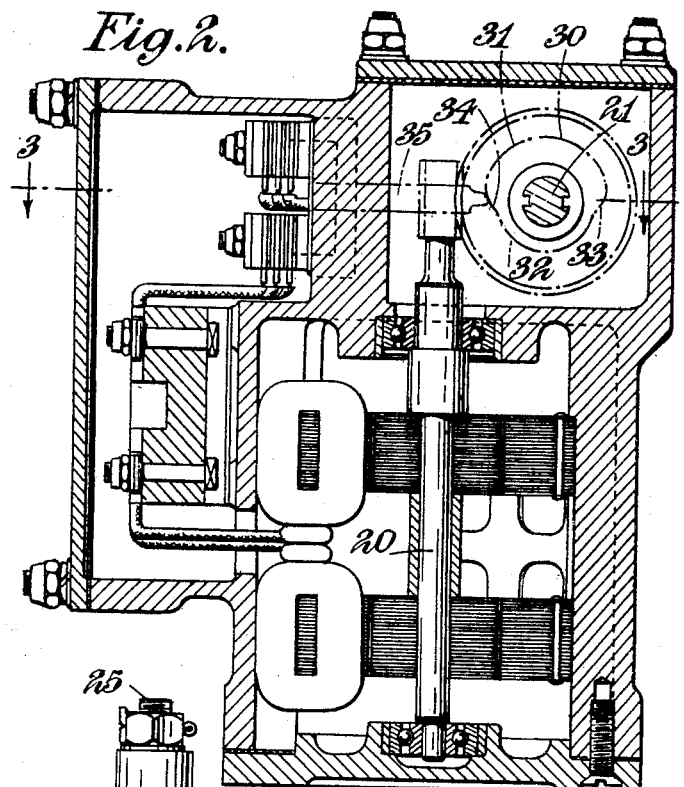
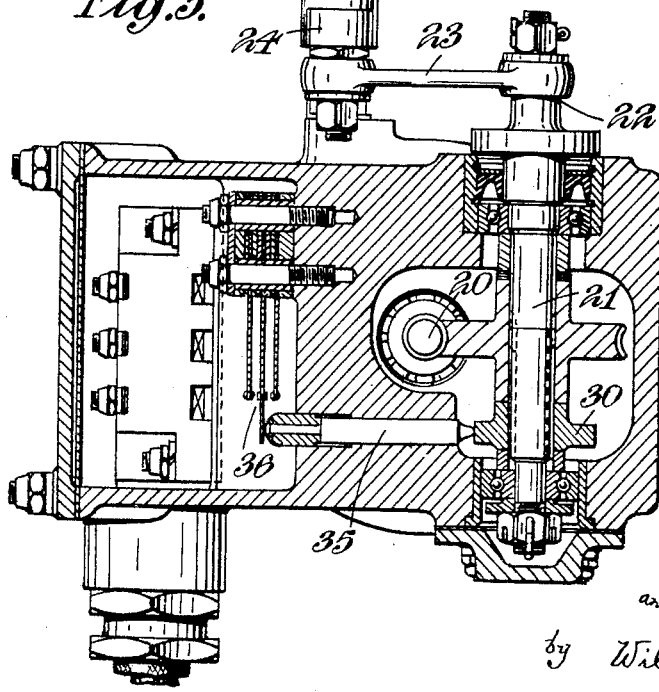

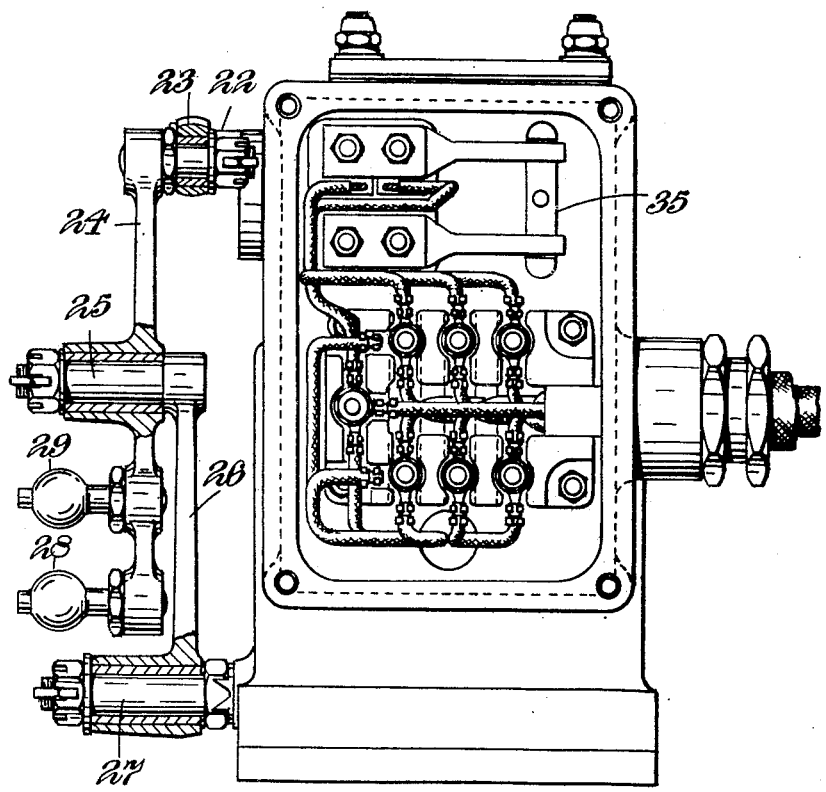

July 4, 1950  J. A. CHILMAN ET AL  2,514,178
SYNCHRONIZING AND SPEED CONTROL DEVICE
Filed June 19, 1946  4 Sheets-Sheet 4
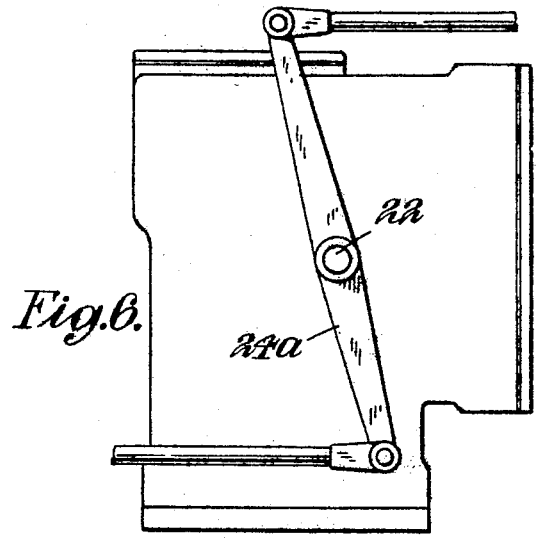
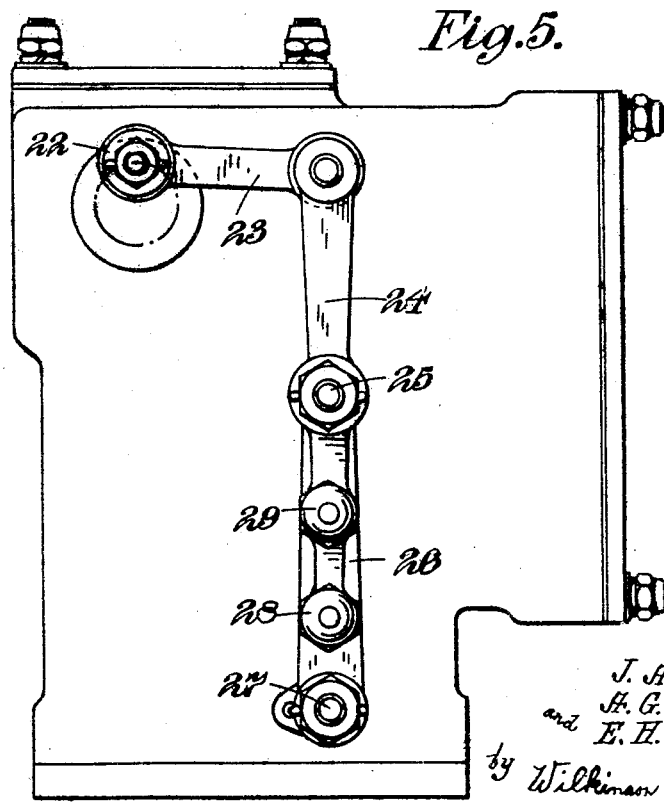

Patented July 4, 1950

2,514,178

UNITED STATES PATENT OFFICE 2,514,178

SYNCHRONIZING AND SPEED CONTROL DEVICE

John Alfred Chilman, Gloucester, Alfred George Mapp, Cheltenham, and Edward Hollingworth Morris, Ashstead, England, assignors to Rotol Limited, Gloucester, England, a British company Application June 19, 1946, Serial No. 677,696
In Great Britain September 25, 1944

Section 1, Public Law 690, August 8, 1946
Patent expires September 25, 1964

2 Claims. (Cl. 170—135.29)

This invention is for improvements in synchronising and speed-control devices such as may be used to synchronise the propellers of a multi-engined aircraft of the kind described in United States patent specification No. 2,296,177. This specification described a synchronising system for a multi-engined aircraft which comprises in combination an alternating-current generator of which the frequency is related to a datum speed, a variable-pitch propeller, a spring controlled speed-responsive device (for example the known constant-speed governor) driven in common with the propeller and adjusting the pitch of the propeller-blades in such a manner as will tend to keep the propeller-speed constant, an alternating-current generator of which the frequency is related to the speed of the propeller, a dynamo-electric machine to which current from the two said generators is supplied and which responds to the frequency-difference between the said generators and therefore to the difference between the speed of the propeller and the said datum speed, and a direct mechanical connection between the dynamo-electric machine and the speed-control of the governor whereby the datum setting of the governor is varied in such a sense as to remove or reduce the said difference in speed.

In the above described system it was suggested that the direct mechanical connection between the dynamo-electric machine and the speed-control of the governor should take the form of a mechanism acting to increase or decrease the effective length of the operating member connecting the pilot's manual constant-speed control-lever with the speed-control of the governor so as to vary the loading on the governor-spring either throughout the entire range of speed, or alternatively merely so as to effect fine adjustment, coarse adjustment of the engine-speed being effected manually.

According to the present invention there is provided in the above described kind of synchronising system, automatic means for adjusting the length of the operating member of each of the governors of a multi-engined aircraft to a predetermined value whenever the synchronising control is out of action.

According to another feature of the invention, the said means for adjusting the length of the operating member is associated with a rotatable cam operatively connected to a reversing switch which energises each differential from its associated alternating current generator when the synchronising system is inoperative, in order to return the cam to its mid position from displacement in either direction.

According to yet another feature of the invention, the means for adjusting the length of the operating member includes a rotatable crank eccentric or cam which provides its full range of control in one half of a revolution or less, but is capable of continuous rotation, and thereby effects a continuous cyclic speed-change when kept in rotation.

The invention also consists in further features hereinafter described and claimed.

One embodiment of the invention will now be described with reference to the accompanying drawings, in which Figure 1 is a diagrammatic layout of a synchronising system according to the invention, Figure 2 is a side view in section of an electrical differential, Figure 3 is a section on the line 3—3 of Figure 2, Figure 4 is a side elevation at right angles to the view of Figure 2, Figure 5 is a side elevation of Figure 4, and Figure 6 is a diagram of a modified linkage associated with the electrical differential.

As shown in Figure 1 each engine 100 of, say, a 4-engined aircraft is arranged to drive a variable-pitch propeller 101, the pitch of the blades being adjusted automatically by a constant-speed governor driven by the engine through shaft 103 so as to keep the engine speeds constant in the known manner.

The governor speeder spring is adapted to be adjusted by a manual constant speed lever 104 conveniently located for actuation by the pilot, this lever being connected to the governor through a mechanical linkage system.

Each engine (100, 100a, 100b, 100c) of the aircraft is arranged to drive an alternator (1, 2, 3, 4) the frequency of the output of which is directly proportional to the engine speed. While only one specific example of engine and its associated generator and dynamo-electric machine has been described above in detail, it will be noted that the same arrangement obtains throughout the remaining engines comprising the multi-engine unit. Also associated with each engine is a dynamo-electric machine (5, 6, 7, 8) which will be hereinafter referred to as an "electric differential" and which comprises a relatively movable stator and rotor, the stator comprising two separate windings (9 10, 11 12, 13 14, 15 16) and the rotor being of the squirrel cage type. Provision is made for alternating current from each engine-driven generator to be supplied to one or other or both of the stator windings. This is conveniently effected by a switching arrangement generally designated by the reference 17, a plurality of switches ganged together and operated by a single control knob 18 are arranged to switch the synchronising system on or off as required, and a further pair of 4-pole switches are ganged together and operated by a control knob 19. These latter switches control the selection of the master engine.

By this arrangement any one of the engines may be chosen as the master engine, for example, the engine driving alternator 1 and in the position of the switches shown in the drawing current is supplied from this alternator to each of the stator windings 9, 11, 13 and 15. In addition, alternator 1 supplies current to its associated stator winding 10. Current from each of the alternators 2, 3 and 4 is supplied respectively to the stator windings 12, 14 and 16 of the differentials 6, 7 and 8 so that if there is a difference of frequency in the currents supplied to the stators 11, 12, for example, then there will be rotation of the differential rotor. As above mentioned, in the case of the master engine the stator winding 10 is also energised from the alternator 1 so that current of the same frequency, but of opposite sense is supplied to the stator windings 9 and 10, and there will consequently be no rotational movement of the rotor.

As will be clear from the diagram of Figure 1 any one of the engines may be selected as the master engine by manual adjustment of the control knob 19 to its appropriate switch position.

The rotational movement of the rotor is adapted to alter the length of the linkage between the constant-speed control-lever and the speeder-spring of the governor and this may be effected in one convenient manner as follows.

The rotor 20 of each electric differential (see Figures 2 and 3), is arranged to drive a shaft 21 through a reduction gearing, preferably of the worm-and-wheel type (Figure 3) which is irreversible. This shaft is arranged to carry at one end a crank-pin 22 to which is attached one end of a link 23 the other end of which is pivotally mounted on a rocker 24 swinging at some intermediate point 25 in its length on the free end of a swinging arm 26, the other end of which is pivotally mounted on a stationary support 27 which may be the casing of the electric differential. One part of the linkage from the constant-speed control-lever is connected to one end 28 of the rocker 24 by a suitable pivotal joint and the other part of the governor-linkage is connected in a similar manner to a point 29 on the rocker which preferably is the junction of the rocker and arm. This arrangement is such that when the synchronising control is out of action the link 23 will be incapable of movement due to the irreversibility of the worm gear so that if the pilot wishes to control the speed of the associated engine he will move his constant-speed lever and this movement will be conveyed to the governor-speeder-spring through the linkage above described.

When the synchronising gear is in operation, and assuming that a slave engine is out of synchronism with the master, and the pilot has adjusted the speed of the slave engine to be approximately that required, then the current supplied to the two stator windings will differ in frequency, which will cause a rotational movement of the crank-pin 22 in one direction or the other so as to alter the effective length of the linkage and thereby alter the tension of the governor-speeder-spring. If the speed of the slave engine differs from that of the master engine by an amount greater than can be accommodated by the arrangement above described, then there will be a continuous rotational movement of the crank pin with a consequent periodic variation in the length of the constant-speed control linkage which will cause the slave engine speed to rise and fall over a predetermined range of speed thus indicating to the pilot by observation of the engine-revolution-counter that he must more closely adjust the manual control so that the synchroniser may deal with the resulting smaller difference of speed.

It is important, as a full consideration of the system will show, that when the synchroniser is switched on all the crank-pins, and consequently the lengths of the constant-speed linkages to the various engines, should be at a datum setting and this is achieved according to the invention in the following manner.

The shaft driven by each electric differential carries a cam 30 which has a high portion 31 and a low portion 32 joined to each other by ramp portions 33, 34. The cam is adapted to move a follower 35 which in turn is arranged to actuate a double-pole double-throw reversing switch 36 (Figure 1) through which current from the alternator associated with the differential is supplied to the stator winding (10, 12, 14 or 16) of the electric differential to cause the rotor to rotate in one direction or the other depending upon the position of the switch.

The switch has a central "off" position and the follower is arranged to contact the mid-point of one of the ramp portions of the cam when the switch is in this position. Further the crank-pin 22 is arranged to be in such a position that the rocker 24 is at about the mid-point of its rocking travel so that the movement of the crank pin in one direction will cause the linkage to be shortened and in the other direction to be lengthened.

The mode of operation of the synchroniser as applied to a four-engined aircraft will now be described. If it is desired, for example, to choose the port outer engine as the master with which the other engines are to be synchronised then the manual selector switch 19 will be moved so that current from the port outer alternator 1 is supplied to the stator winding 9 of its own electrical differential and the windings 11, 13, 15 of the other three differentials. Assuming that the synchroniser is out of action the cam followers 35 of each of the slave engines will be on the ramp portions of the cams and each of the governor control linkages will be at a datum setting as regards length. When the pilot wishes to synchronise the engines he manually adjusts their speeds to be approximately the same, that is, within, say, 150 R. P. M. The pilot now switches on the master control switch 18. This causes each of the slave alternators 2, 3, 4 to supply current to the appropriate stator windings of their associated differentials. If the speed of a slave engine is not in synchronism with the speed of the master engine then the rotor of its associated differential will rotate thus altering the position of the crank pin and the length of the governor linkage. This movement will continue until the associated governor has been adjusted so as to bring the speed of the slave engine into synchronism with the master engine. In this position of the master control and selector switches current from each of the slave alternators is delivered direct to each of the rotor windings of its associated differential and not through the reversing switch above described. All the engines will thus be brought into synchronism with the master, but should it become necessary to choose one of the other engines as master it is merely necessary to turn the selector switch 19 to the appropriate position when the synchronising operation will continue as above described.

When the pilot switches the master control switch to the "off" position the crank pins 22 of the slave differentials may be left in diverse positions and it is obviously essential before starting up the synchroniser again that they should all be returned to their datum setting thus adjusting each of the governor linkages to its predetermined datum length. This is effected by arranging that the master control switch in the "off" position connects each of the slave alternators through its own reversing switch to its associated second stator winding. Considering now one of the slave differentials, if the crank pin had been left in other than the datum position the cam follower 35 will either be on the high (31) or low (32) portion of the cam 30 so that the reversing switch will be in one position or the other. Consequently, since the stator winding (10, 12, 14, 16) is now excited from the associated alternator the rotor will rotate in one direction or the other (depending upon the position of the reversing switch) but always in the sense to return the crank pin to its datum setting and the cam follower to its original mid-position on the ramp portion between the high and low cam portions in which latter position the reversing switch is returned to the "off" position so that the rotor stops. The electrical circuits are so arranged that in this "off" position of the master control switch the stator windings (9, 11, 13, 15) of all the electrical differentials are connected together so that they are virtually shorted out. By this arrangement we have found that improved rotor torque is available when current is applied to the stator windings (10, 12, 14, 16) only for datum setting purposes.

With the embodiment above described it is possible to arrange for the synchroniser to correct errors of engine speed over any desired range but it is preferred that the pilot should adjust the engine speeds reasonably closely so that the synchroniser only has to deal with a small range of engine speed; as above intimated this range may be 150 R. P. M.

The above described embodiment is given by way of example only and actual mechanical arrangements of the linkage and the electric switching arrangements may be adapted to the particular installations to which the synchroniser is fitted. For example, as shown in Figure 6 the rocker arrangement in the constant-speed control linkage may take the form of a simple lever 24a pivotally mounted on the crank pin 22, the mechanical linkage being connected to each end of the lever 24a. Due to the irreversibility of the gearing between the rotor of the differential and the crank pin 22, the lever 24a is to all intents and purposes fulcrum on a fixed pivot and movement of one arm of the mechanical linkage will cause movement of the other arm in the opposite sense, but to a like amount if the arms of the lever 24a are equal. This reversal of motion can easily be accommodated at another part of the linkage if desired, and there may be step-up or step-down ratio between the two parts of the linkage.

We claim:
1. A device for synchronizing and controlling the speed of the engines of a multi-engine aircraft of which one engine is the master and the others slaves controlled thereby comprising a master alterntaing current generator the frequency of which is related to a datum speed, means to drive said generator, a dynamo-electric machine driven by said master alternating current generator and associated with the master engine, for each engine a variable pitch propeller driven by the engine, a constant speed governor driven in common with the propeller for adjusting the pitch of the propeller blades to keep the propeller speed constant at a datum for which the governor is set, an alternating current generator driven by each of the slave engines so that its frequency is related to engine speed, a dynamo-electric machine which receives current from the alternating current generator driven by the slave engine and the generator driven by the master engine and which responds to a frequency difference between said two alternating current generators, proportional to the speed differences between said engines, and the constant speed governor the length of said linkage being adjustable by its associated dynamo-electric machine to vary the datum setting of the governor in a sense to reduce said difference in speed, a switch means, common to all the engines, for rendering the dynamo-electric machine inoperative to synchronise the engines, a cam driven by each dynamo-electric machine, a reversing switch actuated by each of said cams, a circuit connecting each dynamo-electric machine with its associated engine-driven generator through said reversing switch said circuit being completed when said switch means is adjusted to render the dynamo-electric machine inoperative whereby said machine is driven to adjust the linkage to a predetermined length and simultaneously to return said cam to a position at which the reversing switch is opened.

2. A device according to claim 1 wherein the means for adjusting the length of each linkage is an eccentric driven by the dynamo-electric machine associated with the linkage, said eccentric, which is capable of continuous rotation having its full range of control in not more than one half of a revolution thereby to effect a continuous cyclic speed change when kept in rotation.

JOHN ALFRED CHILMAN.
ALFRED GEORGE MAPP.
EDWARD HOLLINGWORTH MORRIS.

REFERENCES CITED

The following references are of record in the file of this patent:

UNITED STATES PATENTS

| Number | Name | Date |
|---|---|---|
| 2,252,518 | Martin | Aug. 12, 1941 |
| 2,261,145 | Dickey | Nov. 4, 1941 |
| 2,264,865 | Taylor | Dec. 2, 1941 |
| 2,296,177 | Newton | Sept. 15, 1942 |
| 2,319,218 | Drake | May 18, 1943 |
| 2,319,552 | Martin | May 18, 1943 |
| 2,339,989 | Glanville et al. | Jan. 25, 1944 |
| 2,412,605 | Drake | Dec. 17, 1946 |
| 2,431,687 | Drake | Dec. 2, 1947 |
| 2,458,398 | MacNeil | Jan. 4, 1949 |